United States Patent
Pawar et al.

(10) Patent No.: US 10,198,507 B2
(45) Date of Patent: Feb. 5, 2019

(54) METHOD SYSTEM AND COMPUTER READABLE MEDIUM FOR IDENTIFYING ASSETS IN AN ASSET STORE

(71) Applicant: Infosys Limited, Bangalore (IN)

(72) Inventors: Prashant P Pawar, Pune (IN); Neeraj Joshi, Bangalore (IN); Sameer Govind Joshi, Pune (IN)

(73) Assignee: Infosys Limited, Bangalore (IN)

( * ) Notice: Subject to any disclaimer, the term of this patent is extended or adjusted under 35 U.S.C. 154(b) by 603 days.

(21) Appl. No.: 14/580,037

(22) Filed: Dec. 22, 2014

(65) Prior Publication Data

US 2015/0186507 A1  Jul. 2, 2015

(30) Foreign Application Priority Data

Dec. 26, 2013 (IN) .......................... 6086/CHE/2013

(51) Int. Cl.
  *G06F 17/30* (2006.01)
(52) U.S. Cl.
  CPC .............................. *G06F 17/30731* (2013.01)
(58) Field of Classification Search
  USPC .................................................. 707/739, 758
  See application file for complete search history.

(56) References Cited

U.S. PATENT DOCUMENTS

| | | | |
|---|---|---|---|
| 7,076,784 B1 | 7/2006 | Russell | |
| 7,181,454 B1 * | 2/2007 | McClamroch | G06F 8/71 |
| 7,322,024 B2 | 1/2008 | Carlson et al. | |
| 7,448,024 B2 | 11/2008 | Breeden et al. | |
| 7,496,567 B1 * | 2/2009 | Steichen | G06F 17/30707 |
| 7,895,563 B2 | 2/2011 | Carlson et al. | |
| 8,095,911 B2 | 1/2012 | Ronen et al. | |
| 8,131,606 B2 | 3/2012 | Bellacicco et al. | |
| 8,595,246 B2 * | 11/2013 | Fay | G06F 17/30734 |
| | | | 707/758 |
| 2003/0126050 A1 | 7/2003 | Theiss et al. | |
| 2006/0074980 A1 * | 4/2006 | Sarkar | G06F 17/3089 |
| 2006/0271546 A1 * | 11/2006 | Phung | G06F 17/30864 |
| 2007/0033531 A1 * | 2/2007 | Marsh | G06F 17/30864 |
| | | | 715/738 |
| 2007/0106657 A1 * | 5/2007 | Brzeski | G06F 17/30731 |

(Continued)

OTHER PUBLICATIONS

Dion H. Goh et al., "Building a portal for reusable software components with Microsoft SharePoint Server: design, implementation and experiences in Singapore", Program, vol. 37 Iss 3 pp. 158-167.

(Continued)

*Primary Examiner* — Cam Linh T Nguyen
(74) *Attorney, Agent, or Firm* — Klarquist Sparkman, LLP (57) ABSTRACT

A method system and computer readable medium for a method of identifying assets in an asset store, said method comprising, receiving an input representing a predetermined requirement, generating semantic based segments of the predetermined requirement, from the received input, mapping at least one parameter for each of the assets in the asset store with the generated segments, the parameter being one of metadata, supporting documents and source code, identifying at least one asset in the asset store based on the mapping, the asset being relevant to the predetermined requirement and providing as output the identified asset.

18 Claims, 2 Drawing Sheets

(56) References Cited

U.S. PATENT DOCUMENTS

| | | | |
|---|---|---|---|
| 2009/0049040 A1* | 2/2009 | Fay | G06F 17/30734 |
| 2009/0055795 A1* | 2/2009 | Finlayson | G06Q 10/06 |
| | | | 717/101 |
| 2009/0083268 A1* | 3/2009 | Coqueret | G06F 8/71 |
| 2009/0132385 A1* | 5/2009 | Inoue | G06Q 30/02 |
| | | | 705/26.1 |
| 2009/0217352 A1* | 8/2009 | Shen | G06F 17/30038 |
| | | | 726/3 |
| 2010/0031234 A1* | 2/2010 | Chaar | G06F 8/20 |
| | | | 717/113 |
| 2011/0106829 A1* | 5/2011 | Pradhan | G06F 17/30699 |
| | | | 707/765 |
| 2011/0137910 A1* | 6/2011 | Hibino | G06F 17/30247 |
| | | | 707/741 |
| 2012/0089456 A1* | 4/2012 | Gupta | G06Q 30/0246 |
| | | | 705/14.45 |
| 2012/0236201 A1* | 9/2012 | Larsen | H04N 21/235 |
| | | | 348/468 |

OTHER PUBLICATIONS

Jorg Koller et al., "Designing a Component Store for Chemical Engineering Software Solutions", Proceedings of the 34th Hawaii International Conference on System Sciences—2001.

Sergey V. Zykov, "Integrating Enterprise Software Applications with Web Portal Technology", Workshop on Computer Science and Information Technologies CSIT'2003, Ufa, Russia, 2003.

* cited by examiner

FIGURE 1
(PRIOR-ART)

Figure 2

METHOD SYSTEM AND COMPUTER READABLE MEDIUM FOR IDENTIFYING ASSETS IN AN ASSET STORE

RELATED APPLICATION DATA

This application claims priority to India Patent Application No. 6086/CHE/2013, filed Dec. 26, 2013, the disclosure of which is hereby incorporated by reference in its entirety.

BACKGROUND

In current scenario many Client IT organizations and IT service providers have built lot of reusable code artifacts/components/services over a period. These assets are rich in business as well as technical functions. Lot of complex business rules are embedded in it. It is expected to leverage these assets while building new custom applications or while migrating existing systems to newer/better technologies. The reuse of these AS IS assets will help in improving asset efficiency, minimize the business risk and reduce the effort/cost/timeline while constructing/migrating to new applications.

Current solutions to manage these assets that are present in many organization have lot of limitations or not capable of handling things like unified interface to internal/external users, support co-development, sophisticated access control, workflow to convert idea into standard component, lifecycle management of component, efficient search, report for usage statistics, versioning, licensing and pricing, access to third party components, auto deployment, cloud enablement, technology agnostic, crowd sourcing, and strong gating process.

SUMMARY

In a preferred embodiment of the present invention there is provided a method of identifying assets in an asset store, said method comprising, receiving an input representing a predetermined requirement, generating semantic based segments of the predetermined requirement, from the received input, mapping at least one parameter for each of the assets in the asset store with the generated segments, the parameter being one of metadata, supporting documents and source code, identifying at least one asset in the asset store based on the mapping, the asset being relevant to the predetermined requirement and providing as output the identified asset.

In another embodiment of the invention, the method provides for generating semantic based segments of the predetermined requirement comprises analyzing the input query to identify semantic interpretations relevant to the predetermined requirement.

In a further embodiment of the invention, the method provides for the parameter for mapping to be obtained from an indexing of each of the assets in the component store to extract the parameters linked to the respective asset.

In another embodiment of the invention, the method of identifying comprises searching across a native asset store and additionally searching across a set of external asset stores thus integrated with the native asset store.

In yet another embodiment of the invention, the method of identifying further comprises the steps of sourcing the assets in the asset store by crowd-sourcing mechanism In yet another embodiment of the invention, the method of identifying further comprises presenting the asset to the user in a SaaS model.

In yet another embodiment of the invention, the method provides for crowd-sourcing the assets comprising of submission of assets from external sources, further wherein the external sources comprise at least one among an individual submission, a crowd sourcing platform and an idea generation platform.

In another embodiment of the invention, the method provides for presenting the asset to the user comprising passing the asset through a gating criteria to identify its compatibility to be published as a web service, the gating criteria comprising client and technology specific checks, code quality checks and code quality metrics checks.

In another embodiment of the invention, the present invention provides a system for identifying assets in an asset store, comprising an input unit for receiving an input representing a predetermined requirement, a processing unit for generating semantic based segments of the predetermined requirement, from the received input, a mapping unit for mapping at least one parameter for each of the assets in the asset store with the generated segments, the parameter being one of metadata, supporting documents and source code, an identification unit for identifying at least one asset in the asset store based on the mapping, the asset being relevant to the predetermined requirement and an output unit providing as output the identified asset.

In yet another embodiment of the invention, the asset store comprises at least one native asset store and one of external asset store, an Integrated Development environment and a pre-configured public web API store.

In yet another embodiment of the invention, there is provided a system for generating semantic based segments of the predetermined requirement comprises analyzing the input query to identify keywords and semantic interpretations relevant to the predetermined requirement.

In another embodiment of the invention, the parameter for mapping is obtained from an indexing of each of the assets in the asset store to extract the parameters linked to the respective asset.

In another embodiment of the invention there is provided a system for identifying further comprising the steps of sourcing the assets in the asset store by crowd-sourcing mechanism.

In another embodiment of the invention there is provided a system presenting the asset to the user in a SaaS model.

In another embodiment of the invention there is provided a system wherein crowd-sourcing the assets comprises of submission of assets from external sources, further wherein the external sources comprise an individual submission, a crowd sourcing platform and an idea generation platform.

In yet another embodiment of the invention, there is provided a system wherein the crowd sourcing further comprises of identifying a uniqueness of the asset, acknowledging the asset submission to the asset store, rewarding a corresponding contributor for the successfully submitted asset and managing an Intellectual property of the asset.

BRIEF DESCRIPTION OF THE DRAWINGS

The various embodiments of the invention will hereinafter be described in conjunction with the appended drawings, provided to illustrate, and not to limit, the invention, wherein like designations denote like elements, and in which.

DETAILED DESCRIPTION

In order to describe the terms used in this invention, here below is provided a glossary of terms:

Asset: An asset is treated as an entity in an asset store and may be a source code, binary code, a requirements specification, a design document, a model, a use case, test plan, a high level design document and a collaboration diagram, any other relevant project documentation.

Asset Store: An asset store is used to store and publish the assets as mentioned above and services. As the portfolio of assets builds, users may be able to make use of them in future projects, dramatically increasing the return on the original investment. As an example, an asset store may be accessible from multiple applications, including software applications, web browsing applications, and a system desktop. In some examples, an asset store may be a window within an application. In other examples, an asset store may be a window attached to one side of an application. In still other examples, an asset store is a window on the system desktop. Thus, a user may easily access an asset store and the assets housed within an asset store from any application. Changes to an asset store may be duplicated across some, all, or none of the instances of an asset store. Further, an asset store may be accessed from multiple systems, allowing multiple users to access the same asset store and enabling sharing of assets between colleagues, clients, vendors, or other types of users.

Predetermined requirement: This includes context as well as actual business requirements. Context is derived based on user, profile, project etc.

Input: input comprises keywords, string input, and any other traditional format for providing search query. It may also comprise user inputs requesting for a specific asset or resource. Input may also comprise of any file describing the business, technical requirement.

Subsequent to the details provided above the invention is described in further detail. While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternative falling within the spirit and the scope of the invention as defined by the appended claims.

The method steps have been represented where appropriate by conventional symbols in the drawings, showing only those specific details that are pertinent to understanding the embodiments of the present invention so as not to obscure the disclosure with details that will be readily apparent to those of ordinary skill in the art having benefit of the description herein.

The terms "comprises", "comprising", or any other variations thereof, are intended to cover a non-exclusive inclusion, such that a process, method that comprises a list of steps does not include only those steps but may include other steps not expressly listed or inherent to such process, method. Similarly, one or more elements in a system or apparatus proceeded by "comprises . . . a" does not, without more constraints, preclude the existence of other elements or additional elements in the system or apparatus.

The features of the present invention are set forth with particularity in the appended claims. The invention itself, together with further features and attended advantages, will become apparent from consideration of the following detailed description, taken in conjunction with the accompanying drawings. One or more embodiments of the present invention are now described, by way of example only, with reference to a specific example of smart card. The invention is by no means bound by this particular example.

Figure 1:
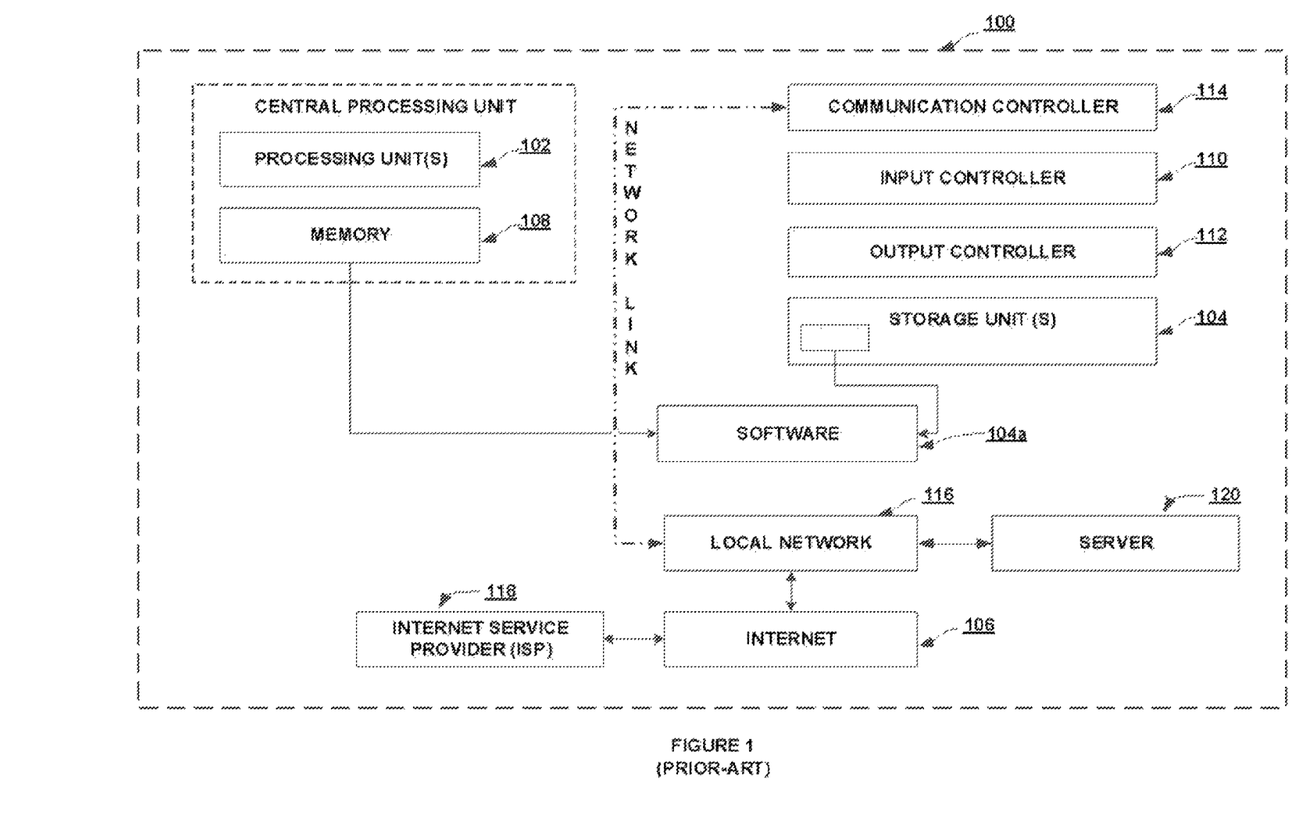
FIG. 1 illustrates a system in which various embodiments of the invention may be practiced, in accordance with an embodiment of the invention.

FIG. 1 (PRIOR-ART) is a block diagram of a computing device 100 to which the present disclosure may be applied according to an embodiment of the present disclosure. The system includes at least one processor 102, designed to process instructions, for example computer readable instructions (i.e., code) stored on a storage device 104. By processing instructions, processing device 102 may perform the steps and functions disclosed herein. Storage device 104 may be any type of storage device, for example, but not limited to an optical storage device, a magnetic storage device, a solid state storage device and a non-transitory storage device. The storage device 104 may contain software 104*a* which is a set of instructions (i.e. code). Alternatively, instructions may be stored in one or more remote storage devices, for example storage devices accessed over a network or the internet 106. The computing device also includes an operating system and microinstruction code. The various processes and functions described herein may either be part of the microinstruction code or part of the program (or combination thereof) which is executed via the operating system. Computing device 100 additionally may have memory 108, an input controller 110, and an output controller 112 and communication controller 114. A bus (not shown) may operatively couple components of computing device 100, including processor 102, memory 108, storage device 104, input controller 110, output controller 112, and any other devices (e.g., network controllers, sound controllers, etc.). Output controller 112 may be operatively coupled (e.g., via a wired or wireless connection) to a display device (e.g., a monitor, television, mobile device screen, touch-display, etc.) in such a fashion that output controller 112 can transform the display on display device (e.g., in response to modules executed). Input controller 110 may be operatively coupled (e.g., via a wired or wireless connection) to input device (e.g., mouse, keyboard, touch-pad, scroll-ball, touch-display, etc.) in such a fashion that input can be received from a user. The communication controller 114 is coupled to a bus (not shown) and provides a two-way coupling through a network link to the internet 106 that is connected to a local network 116 and operated by an internet service provider (hereinafter referred to as 'ISP') 118 which provides data communication services to the internet. Network link typically provides data communication through one or more networks to other data devices. For example, network link may provide a connection through local network 116 to a host computer, to data equipment operated by an ISP 118. A server 120 may transmit a requested code for an application through internet 106, ISP 118, local network 116 and communication controller 114. Of course, FIG. 1 illustrates computing device 100 with all components as separate devices for ease of identification only. Each of the components may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be one or more servers, for example a farm of networked servers, a clustered server environment, or a cloud network of computing devices.

Figure 2:
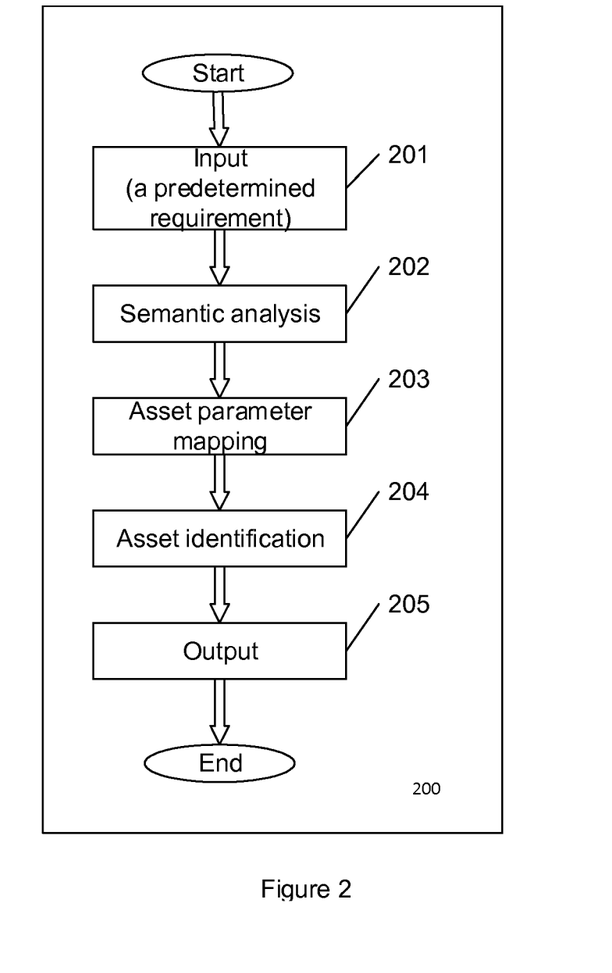
FIG. 2 illustrates an exemplary block diagram of a system for the method of assets in an asset store.

With reference to FIG. 2 is a flowchart illustrating an example operation of retrieving reusable assets from asset management system 200. Based on input (201), a processing unit performs a semantic analysis (202) on the input to identify frequently used keywords and semantic interpretations relevant to the predetermined requirement. In an exemplifying implementation of the semantic analysis, if a user has a requirement document consisting Customer management in B2B domain, the asset store may display CRM component, while if it is B2C, it may display User management. In another exemplifying implementation of the semantic analysis in a scenario for a requirement in Retail domain, term "Customer" would typically be end consumer while for Airline industry, it is the "Passenger" while for Banking it is the "Account holder" in a general environment. Asset Store builds the relevancy by deriving this context using user data, requirement data, portfolio data, usage history, and other input provided by user, including search keywords. Upon extraction of the relevant details above, parameter for mapping (203) is obtained from the index of each of the assets in the asset store to extract the parameters linked to the respective asset being indexed. To derive the mapping, asset store makes use of asset metadata, context data that includes usage history, user history, user skills, portfolio details and usage by other team members, and also the meaning based on asset internals. It uses various templates to identify the metadata to be extracted from the asset. The templates used and the details extracted from an asset vary based on the asset type. For example, it extracts the header, footer, font, and other structural aspects of a report document while extracts data types, methods, functions, interfaces used in a web service type of asset. Upon obtaining a set of parameters that are to be mapped with the requirement, an identification unit performs a search across a native asset store and additionally across a set of external asset stores integrated with the native asset store to make an identification (204) of an appropriate asset/s. Based on user request, output module presents the identified assets to the search specification.

In addition to or in conjugation with the description of the invention with respect to the drawings enclosed herein, embodiments of the present invention also disclose the aspects as described below. Although the description below is directed towards explaining the invention in view of a software Asset store, it may be suitably extended to any form of digital asset contained in the aforementioned asset store Asset Identification: This includes finding the Asset that map to the user requirements. This may implement any specific framework known in the art, to come up with possible service candidates. This is done by converting the requirements defined in the available format into requirement aggregates that are logically related and could possibly form the service. The evolution of same can be controlled by the designer using configuration options. It may also map the existing Assets against the itemized requirements or unstructured requirements using Cosine Similarity and tf-idf algorithm which are well known in the art. Cosine similarity is the measure of similarity between two vectors by measuring the cosine of angle between them. To find similarity between documents we represent documents as a vector. Tf-idf (Term frequency-inverse document frequency) is an algorithm which reflects how important a word is in a document in a collection of documents. For the purpose of the present invention, Cosine Similarity and tf-idf algorithm involves extracting the asset metadata, including the code itself, along with the supporting documents provided along with, and matching it with the requirements to auto-suggest mapping.

Asset Search: Apart from automated mapping, there is a manual search provision that can also be used to map the Assets to the user requirements. The search context data is used to improve the search asset. The order in which the search results are presented is context driven. The asset search is able to search the asset across multiple client stores, native or external Asset stores. It can also search natively within the pre-configured stores like public web API. The search results indicate the source of assets and let user select and use the asset locally. Asset Store manages the interaction with public stores completely. There are prominently two different methods in which asset store interacts with external service providers wherein "external" indicates a non-local instance of the asset store. Method 1: Service based integration: In this method, the external service provider provides a catalog service or RSS feed to search the assets and provides either a URI or another service to obtain the actual asset details. This is implemented for stores like Public Web API store. Method 2: Direct parameter injection: In this method, the service provider does not expose catalog service, but provides the access to the code directly. Asset store executes the code and parses the search results to makes it available for asset store users. This is used to retrieve assets from internal repository of knowledge artefacts. The search provided is similar to tokenized search and it also brings up relevant assets as users type in the search tags. Apart from this, Asset Store also hosts a search tag cloud for locating frequently used search terms. For faster and easier accessibility, rich search functionality is provided in Asset Store. This being an important function, it is made available across all Asset Store web pages. The indexing is done on various applications as well as asset attributes to enhance search accuracy and efficiency.

Asset Store also exposes search services to map against the input requirement document. Cosine Similarity algorithm (map the asset metadata with the input requirement and pick the best matching asset as match) may be used to get the matching search results against the same. This helps generate possible asset match against every requirement in an automated manner. To enhance the user experience, the usage, user preferences, project, asset metadata is used to pre-filter the search results and auto suggest relevant assets (context aware search). The search also implements semantic algorithm to accept English like query string as input and still produce relevant results efficiently.

Asset Definition: This includes defining various interfaces, methods, properties, configuration of the asset. This is done by the architect/designer and the output is re-used in the asset development phase. This functionality is provided through plug-in for IDE like Eclipse and Visual Studio. The assets such defined can easily integrate with other tools.

Idea Generation: Asset Store supports conducting Idea generation events and complete end to end workflow management from definition to implementation of the ideas. Asset store may provide mechanism to define a new event. Once a new event is created in Asset store, the admin may create set of users that contribute the ideas. The users may have access to create and update ideas in Asset store. After the submission of ideas the review may take place. The designated reviewer may validate the ideas. After validation these ideas may be ranked based on certain guidelines including relevancy of idea, overall impact of idea and feasibility of implementation. The approved ideas may go through IP validation and upon successful clearance the relevant notifications may be sent to stakeholders. The ideas may be related to a specific domain, specific technology or for any other special need. The Asset store acts as a store front for crowd sourcing events in a unified manner. It also facilitates transferring these IPs to the centralized asset store and making those available for other users. Users may be able to submit the ideas for new asset development as well as enhancing the existing assets. These ideas are checked automatically for their duplicity, match with the other assets that are similar based on the context. If these are unique, such ideas could then be moved to review stage and approved. These could then be rated by group of users that may help in prioritizing the same. These could then be moved into asset initiation stage where it may be taken up for development. It maintains the complete traceability of idea submitter to idea to asset and asset developer. This helps in tracking IP and monetization of the IP in future.

Asset Development: This is primarily supported through the plug-in for IDE like Visual Studio and Eclipse. User can select the implementation details for the asset and generate the structure for holding the asset functionality. The same may be embedded in the current solution of the developer to facilitate quicker development. All the metadata for the same may be sourced from Asset Store. If user modifies anything in the structure manually, there may be a provision to sync up the same with the asset metadata already stored. There may also be a provision to delegate assets submitted to another developer along with the relevant artefacts.

Asset Submission: The assets developed need to be submitted to the asset store for further processing. It may follow the workflow as is mentioned in further detail below. Along with asset, other supporting documents, test scripts, results, NFRs etc. also need to be updated. The approver can either publish the asset or reject it and send it back. This may primarily be done through asset store. Before the status is changed to Published, multiple automated and manual checks are applied on the asset details furnished. Some of the checks include IP Check, Version check, Duplicity check, Standards check, NFR check, Documentation check, PQM reporting, etc. Depending on the type of asset and stage of the asset development, different gating criteria are applied. The gating criteria may include any conformance guidelines shared by a client or industry best practices. As an example, all large enterprise applications follow strict coding guidelines to ensure maintainability of the assets. These may include upper and lower bounds for validating specific parameters like LOC (Lines of code), Cyclomatic complexity, number of branches in IF loop, to name a few. Both the submitter and reviewer may be able to get the visual dashboard of scoring based the pre-configured weightages for these parameters and actual rating obtained using the above automated check. All failures to compliance may be verified and notified to submitter as well as reviewer. If the asset does not pass the pre-defined basic gating criteria, the submission of asset may be prohibited. The reviewer, typically an SME in the technology or domain to which the asset belongs, also has options to suggest enhancements to the assets and this is sent back to the submitter for his perusal.

Asset Publishing: This process may include making asset available on the Asset Store for users. Unless the asset state is changed to Published, the users cannot download the assets. After publication, the assets may be hosted for consumers. If the asset submitted is of web service form, Asset Store automatically compiles the asset and deploys it on the pre-configured server. This functionality may be exposed through Asset Store. Applications can consume the above services in a Software as a Service (SaaS) model, wherein they just get the functionality and not the code of the service over the internet/intranet.

Asset Save: Asset gets saved when submitted through asset store. The source files may be verified for conformance to the predefined specific architecture through an automated script. Asset Store automatically maintains versioning for the submitted asset. It provides reviewer with options to specify type of changes done and this is linked to availability of asset for future enhancements, usage, etc. Notifications sent are also driven by the same.

Asset Testing: Since assets are adhering to standard architecture, it may be possible to automate test script generation, test execution to an extent. Standard test automation tools may be integrated via plug-ins to enable the same The test scripts are stored in a specific pre-defined format to enable re-use of the same while auto-generating the test scripts for the assembled application. This may improve test script re-use during regression testing of the application developed using such assets.

Idea/Asset Rating: The assets published in Asset Store could be rated by the users providing valuable qualitative and quantitative information that includes suggestions for enhancements, bugs, efforts saved/potential, relevant assets, etc. Asset Store ensures that only those users that have downloaded the assets, and used it in the project, may be able to rate and provide feedback. This may help enrich the Asset Store using inputs from end users.

Asset Execution: The assets are exposed as services, DLLs, Exe or code libraries, etc. The asset services may run under standard container or customized container. Asset store may have an asset manager to provision these services. It may also support service virtualization for the assets that are in build phase. Mocking of services may help in reducing integration issues across application and reduce development time too. Asset Store may also provide an additional support for the custom container (enhanced container wrapper) that may provide utility services like security, authentication, etc., in-built. Container helps provide managed and controlled environment for providing automation for various asset interactions. Standard containers are managed by operating system and they support the runtime execution of assets. Custom containers manage aspects like authentication, integration, caching, and thread handling. The container may provide the service interface for the code libraries. It may also provide adapters to suit target runtime of the asset. This functionality may be integrated with the IDE to support seamless experience for asset consumption to the end user.

Asset Service Bus: The asset services may be exposed to the end consumers through service bus. It may also provide connectors for communicating with the external assets and various pre-configured asset stores in a standard way.

Asset Pricing, Licensing: The asset store may store association of asset with a particular licensing and pricing model. E.g. The SaaS based delivery may have pay per use model, source code based re-use may have onetime payment model, etc. It may support various pricing models like pay per use, pay per user, pay per application, pay per client, etc. It may also support customizable pricing models for client managed asset stores. It may keep track of the asset usage, asset agreement and pricing for the given asset per user. It may provide comprehensive features to avoid over-use/under-use of the subscription and provide intelligent inputs to the subscriber around optimized licensing model that should be adopted, based on client specific context (technology, type of assets used, overall usage, etc.). The pricing agreement may be maintained online and complied to every time the asset is used. Any non-compliance may prohibit the user from consuming that particular asset.

Asset Communication/Reporting/Dashboards: There may be customizable reporting as well as dashboards provided in the Asset Store that may help the user customize his experience and also ease monitoring, and tracking activity. It may also publish the latest updates to the asset store through mailing lists, RSS feeds, etc. It may also have a section to track the latest developments in the field of asset development that may be automatically shown to the users. Asset Store may provide comprehensive email and dashboard notifications for various actions or information items related to various artefacts, users, projects, etc. in the asset store and is totally customizable in terms of enabling/disabling it for specific events, recipients, frequency, format, etc.

External Asset Store Integration: The asset store may provide a facility to connect with the existing client asset stores external asset stores and leverage the asset services exposed by them. E.g. PublicWeb API stores. This integration is in-built for the pre-defined stores and is natively available to the store user from search to application usage. Asset Store ships with various standard adapters that could be configured to enable interaction with non-Asset Store asset stores. Every installation of the store can configure this interaction along with site specific credentials, keys, etc.

User Management: The asset store also provides an interface to manage various users that use the asset store. It helps associate users to project, role management, etc. The asset store may follow dual authentication and role based access mechanism. The visibility of various IPs can be controlled by project or user configuration. The user access can be controlled by individual user management or through distribution lists.

Crowd Channel Integration: The asset store provides different user experience, registration, workflows, asset submission space for crowd sourced asset. These could be internal or external crowd sourcing avenues. It also integrates Asset Store with idea generation platforms so that the top rated ideas could be taken forward for implementation. The code submitted is scanned through open source scan software (OSS) to detect plagiarism, along with other code quality checks. Asset Store also has reward and recognition mechanism depending on the contribution levels, quality, frequency, consistency, adoption of the asset developed by the contributors. As an example, every asset that is approved may fetch 5 points for author of the asset. Similarly, the adoption and usage of the asset may fetch additional 5 points per usage up to a maximum of 500 points. Such points would automatically be made available to the submitter and can be redeemed in exchange of rewards through an online retail store coupons. There may be annual events to facilitate generation of new IP. Asset Store may provide an interface to configure the rules for such awards/rewards and publish the same to the winners in an automated manner at regular intervals. There is an IP management and monetization process for the crowd sourced assets to ensure no infringement is made and liability is managed through agreements.

Help/Feedback/Reference Implementations: Asset Store provides reference implementations for the assets hosted in it. Along with reference implementation for individual assets, it also provides domain specific implementations using set of assets. This helps users to easily implement the assets within their projects. It also has help mechanism to show context specific help. The feedback mechanism helps capture functionality specific feedback, issues, enhancement requests, etc. and is sent to the helpdesk for further processing.

All of these functionalities are constructed using service oriented architecture and services are made available to internal/external users as web services.

Workflows: The entire lifecycle of asset (as listed below) may have a workflow and various user roles associated with it. The same may be managed through Asset Store. Asset store may also send out notifications and capture remarks at every stage of the asset lifecycle, wherein the stages would typically be in the sequence as given below Idea submission→Idea review→Idea Approval→Idea rating→Asset Initiation→Asset Development→Asset Submission→Asset Gating→Asset Review→Asset Approval→Asset Publication For any new enhancement or change to Asset, impact analysis is done and depending upon need the above workflow is followed. These workflows are managed either by explicit user actions, or may be triggered at pre-configured time frequency or based on the automation tools integrated.

The asset store may provide rich UI and information to help reviewer in quick impact analysis, historic updates, recent changes, etc.

It may also provide options to customize workflows, users, notifications, for an organization wide implementation, depending on the role and functionality being customized.

Domain Ontology: Every application, project, asset may be mapped to a particular domain. It may also be mapped to one or more specific line of business where the business asset is more suited. The search tags and keywords associated with the asset may be modeled on a domain dictionary. The same is also used for parsing the search string provided by the users. This domain ontology may also be used while converting the input requirement document into the itemized requirement document (document consisting of aggregates of logically related requirements).

Standards Check: As soon as the asset is submitted, an automated script may run and apply the standards check on the submitted source files. The Asset Store may provide an option to select user scenario specific standards format or default pre-defined standards template. Percentage compliance along with the details of pass/failed checks is presented to the user Asset as well as reviewer upon submission of asset. If the compliance is failing on certain pre-defined basic parameters, the submission may not go through. The reviewer may however have an option to bypass certain conditions in order to facilitate outlier asset submission. With configuration, additional tools may be integrated runtime for bettering code quality.

Version Management: Asset Store may house multiple versions of the same asset. Version manager may ensure submission of relevant documents, version change reason, etc. along with the asset source code. It may also host the asset service automatically to the asset store. When the client may request a specific asset service, a check may be made through the version manager on validity of the requested service version. There may be alerts, notification, hard/soft gating criteria applied on versions to ensure consistency across asset usage and current state of the asset. These versions of assets may optionally be integrated with source code management tools like TFS, SVN, etc.

License management: Asset Store may offer multiple pre-defined options for licensing of the assets. Admin may be able to choose the suitable licensing model for the asset. License manager may also store the asset usage data. This may further be used for tracking, monitoring, reporting as well as billing purposes. Apart from in-built license manager, asset store may also provide an integration with the standard license management tools.

Profiling (Application, Asset): While submitting the asset to the Asset Store, the PQM (Product Quality Metric) details may be auto updated using tools like FxCop. Also, various attributes like technology, domain, search tags, operating system, asset users, etc. may be automatically extracted and stored along with the asset details. Similarly, application profile data may also be stored and may include attributes like technology, domain, line of business, client, IP type, etc.

Access Control Manager: The asset store may implement dual authentication: form based and web based. Access may be provided only to the registered users depending on the roles setup in the Asset Store. Admin may have access to setup the users and their accesses. External users can also register for Asset Store access. Internal users may get access to assets based on the project asset association as present in the Asset Store. The asset store can also provide integration with enterprise specific project management system to do user management.

Adapters, Connectors: Asset Store may provide the endpoints for the asset services through Enterprise Service Bus (ESB). This may facilitate easy maintenance as well as deployment of services through the client applications. The ESB may also host service connectors for standard third party services, e.g. Sales Force. Client specific service adapters could also be developed and hosted similar to the above.

Asset (Store) Manager: Store manager may be responsible for admin functions of the Asset Store. It may enable admins to manage various reference data, add project, user, asset, provision asset services, licensing, pricing models, billing type, etc. They may also be able to customize notifications, IP settings of the Asset Store. There may be a separate analytics and reporting section available to the store manager for drawing intelligent insights through the usage, search and context data collected. The asset store may also provide recommendations based on the context available. The context is formed on the basis of multiple parameters including user skills, user asset submission, usage history, portfolio details, other team members in the portfolio, skills utilized in the portfolio, asset rating, asset recentness, user preferences, client specific preferences, and relevance from domain, application perspective. The context is created using the above parameters by employing methods already known in the art.

All of the metadata, configuration data, etc. may be configured through an online or batch interface or XML configuration by the store administrator to provide site specific customization.

Disclosed embodiments provide computer-implemented methods, systems, and computer-readable media for identifying and managing an asset in an asset store. The embodiments described herein are related to facilitating asset identification and asset management. While the particular preferred embodiments of the present invention have been shown and described, it will be obvious to those skilled in the art that changes and modifications may be made without departing from the teachings of the invention. It is therefore contemplated that the present invention cover any and all modifications, variations or equivalents that fall within the scope of the basic underlying principles disclosed above and claimed herein.

It is also to be understood that the present disclosure may be implemented in various forms of hardware, software, firmware, special purpose processors, or a combination thereof. Preferably, the present disclosure is implemented in software as a program tangibly embodied on a program storage device. The program may be uploaded to, and executed by, a machine comprising any suitable architecture.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method of identifying software assets in an asset store, said method comprising:
   indexing software assets of the asset store to build an index of parameters of the software assets;
   receiving an input representing a predetermined requirement;
   generating a semantic based vector of the predetermined requirement, from the received input;
   using a cosine similarity algorithm with the generated semantic based vector of the predetermined requirement, to map at least one parameter of the parameters for each of the software assets in the asset store with the generated segments, the at least one parameter being obtained from the index and selected from metadata, supporting documents, or source code;
   identifying at least one software asset in the asset store based on the mapping, the identified software asset being relevant to the predetermined requirement; and
   providing the identified software asset as output.

2. The method of claim 1, wherein generating semantic based segments of the predetermined requirement comprises analyzing an input query to identify keywords and semantic interpretations relevant to the predetermined requirement.

3. The method of claim 1, wherein the method of identifying comprises searching across a native asset store and additionally searching across a set of external asset stores thus integrated with the native asset store.

4. The method of claim 1, further comprising sourcing the software assets in the asset store by crowd-sourcing the software assets.

5. The method of claim 4, wherein crowd-sourcing the software assets comprises of submission of software assets from external sources, further wherein the external sources comprise one or more of an individual submission, a crowd sourcing platform, or an idea generation platform.

6. The method of claim 1, further comprising presenting the software asset to the user in a software as a service model.

7. The method of claim 6, wherein presenting the software asset to the user comprises passing the software asset through a gating criteria to identify its compatibility to be published as a web service, the gating criteria comprising client and technology specific checks, code quality checks, and code quality metrics checks.

8. The method of claim 1, wherein the at least one parameter for each of the software assets in the asset store is selected from a template that is based on an asset type of each of the software assets.

9. The method of claim 8, wherein the asset type is a web service type for a web service asset of the asset store, and the at least one parameter for the web service asset includes a data type and an interface of the web service asset.

10. A system for identifying software assets in an asset store, said system comprising:
- an input unit for receiving an input representing a predetermined requirement;
- a processing unit for generating a semantic based vector of the predetermined requirement from the received input;
- selecting at least one parameter for each of the software assets of the asset store with a pre-defined template, the template based on a type of the respective software asset, the template identifying one or more items of metadata for the type of the respective software asset;
- a mapping unit for using a cosine similarity algorithm with the generated semantic based vector of the predetermined requirement, to map the at least one parameter with the generated segments, the at least one parameter being one of metadata, supporting documents, or source code;
- an identification unit for identifying at least one software asset in the asset store based on the mapping, the identified software asset being relevant to the predetermined requirement; and
- an output unit providing the identified software asset as output.

11. The system of claim 10, wherein said asset store comprises:
- a native asset store; and
- at least one of an external asset store, an Integrated Development environment, or a pre-configured public web API store.

12. The system of claim 10, wherein generating semantic based segments of the predetermined requirement comprises analyzing an input query to identify keywords and semantic interpretations relevant to the predetermined requirement.

13. The system of claim 10, wherein the parameter for mapping is obtained from an indexing of each of the software assets in the asset store to extract the parameters linked to the respective software asset.

14. The system of claim 10, further comprising sourcing the software assets in the asset store by crowd-sourcing the software assets.

15. The system of claim 14, wherein crowd-sourcing the software assets comprises receiving submission of software assets from external sources, and wherein the external sources comprise an individual submission, a crowd sourcing platform, or an idea generation platform.

16. The system of claim 14, wherein crowd-sourcing the software assets further comprises:
- identifying a uniqueness of a particular software asset;
- acknowledging a submission of the particular software asset to the asset store;
- rewarding a corresponding contributor for the successfully submitted particular software asset; and
- managing an intellectual property of the particular software asset.

17. The system of claim 10, further comprising presenting the software asset to the user in a software as a service model.

18. A computer program product comprising a non-transitory computer-readable medium including instructions that upon execution cause a computer to:
- receive an input representing a predetermined requirement;
- use the received input to generate a semantic based vector of the predetermined requirement;
- extract metadata for respective software assets of an asset store, the metadata extracted by using a pre-defined template, based on an asset type of each of the respective software assets, that identifies one or more items of the metadata to be extracted for the asset type;
- map the extracted metadata for each of the software assets in the asset store, wherein the mapping comprises using a cosine similarity algorithm with the generated semantic based vector of the predetermined requirement;
- identify at least one software asset in the asset store based on the mapping, the identified software asset being relevant to the predetermined requirement; and
- provide the identified software asset as output.

* * * * *